Aug. 31, 1943. J. HALTENBERGER 2,328,141
SUSPENSION MEANS FOR AUTOMOBILE TRANSMISSIONS
Filed June 17, 1940
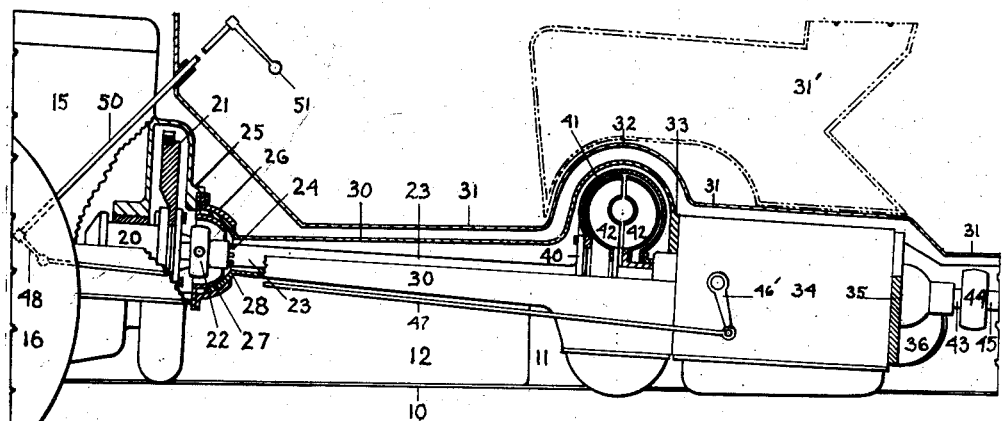
Fig.2.
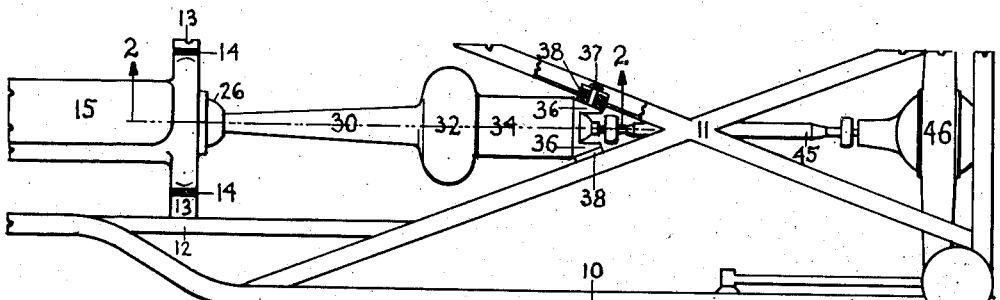
Fig.1.
Fig.4. Fig.1A.
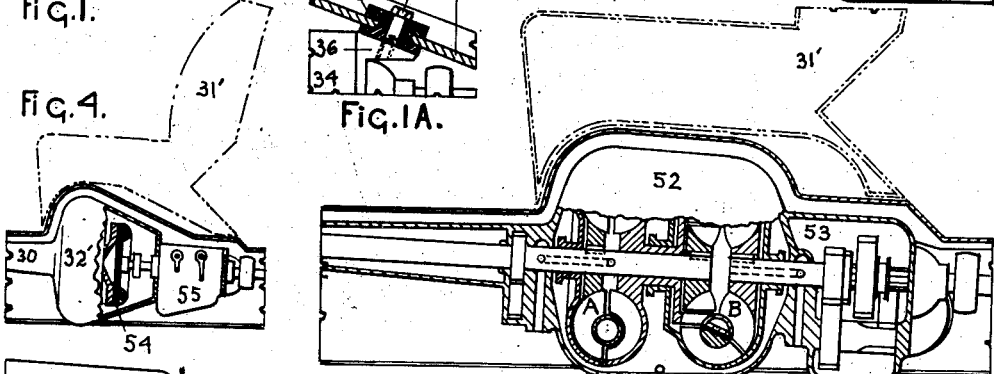
Fig.3.
Fig.5.
INVENTOR.
Jules Haltenberger Patented Aug. 31, 1943

2,328,141

UNITED STATES PATENT OFFICE 2,328,141

SUSPENSION MEANS FOR AUTOMOBILE TRANSMISSIONS

Jules Haltenberger, Ann Arbor, Mich.

Application June 17, 1940, Serial No. 340,921

4 Claims. (Cl. 180—70)

My invention relates to suspension means for automobile transmissions, and this application is a continuation-in-part of my co-pending application Serial No. 208,292, filed May 16, 1938, now Patent No. 2,204,989. It also relates to my Patent 2,092,507.

It has been proposed, to remove a flywheel containing a positive (cone) clutch from the engine and place it under the driver's seat. The successful application of this sort of proposal necessitates a crank shaft rear extension of over two feet and correspondingly a shaft diameter of over six inches, to control the usual reciprocating engine's angular velocity variations. Here it is proposed, the retention of the flywheel on the crank shaft near the cylinders, and in the preferred form the use of one or more hydrokinetic devices disposed under the drivers' seat.

It is the object of my invention to increase in an automobile the usefulness of the usual front center seat space, and to reduce or eliminate floor obstacles near the driver.

A further object is to mount one or more usually bulky hydrokinetic devices under the driver's seat while employing but one connection to the crank shaft.

A further object is to increase the useful floor space in an automobile by moving the engine forward and counteracting this engine position by disposing a hydrokinetic transmission unit now reaching 100 lbs. weight under the driver's seat, for the benefit of directional stability.

Further and more particularly expressed objects of the invention will appear as the description proceeds.

My invention may be embodied in the forms illustrated: Here, Fig. 1 is a plan view of a chassis of an automobile with parts left off; Fig. 1A is an enlargement of a section illustrated in Fig. 1; Fig. 2 is a section substantially on lines 2—2 of Fig. 1 here shown in a larger scale; Fig. 3 is a modification of the invention illustrating the construction under the driver's seat; Fig. 4 is a further modification shown in a smaller scale; Fig. 5 is a further modification of the invention.

Referring to Figs. 1, 1A and 2 inclusive, it will be seen that the usual widely spaced parts of frame side members 10 (Fig. 1 shows only one) are inter-connected by an X member 11. The usual narrowly spaced fore-parts (Fig. 1 shows only one) are provided with usual engine supporting frame extensions 12 having engine supporting brackets 13 and rubber engine mounts 14, for the rear support of engine 15.

The frame is supported by front wheels 16 and rear wheels 17 (only one of each is shown) in the usual manner.

Engine 15 includes a usual crank shaft 20 carrying a flywheel 21 and a universal joint 22 arranged to drive a power transfer shaft 23 by splines 24. The engine is also provided with a fly wheel housing 25 carrying an outer part-ball sphere 26, inner part-ball sphere 27 for the adoption of a mating part-ball sphere 28 on stationary power transfer shaft tube 30 positioned under the forepart of the usual body floor 31.

Stationary tube 30 at its rear is formed into an enlarged circular housing 32, and terminates in a flange 33 arranged to support a usual change speed transmission in housing 34 in the usual manner. Housing 34 at its rear is provided with an end cover 35 having angular mounting lugs 36 for the adoption of mounting bolts 37 passing through the X member, where rubber blocks 38 support the rear end of the transmission unit.

Power transfer shaft 23 terminates in flange 40 arranged to drive a circular housing 41 containing hydrokinetic clutch elements 42. Housing 34 contains a usual change speed transmission having a power output shaft 43 with a universal joint 44 thereon arranged to drive a propeller shaft 45 connected to power axle 46. On housing 34 a usual change speed lever 46' is controlled by rod 47, lever 48 on control shaft 50, and is operated from the driving compartment by a usual lever 51.

The constructions of hydrokinetic clutches and associated change speed transmissions are not new with the applicant. They are well known and it is believed that in view of repeated publications their detailed description would only complicate this presentation. It is important to note however that all hydrokinetic devices have relatively large diameters and thick cross sections and are very bulky in construction, these being inherent essentials for their efficient performance.

The above described construction is a reduction to two simple units: an engine unit supported on usual rubber blocks, and a change speed unit. The change speed unit in front is supported by the engine unit, and at the rear is supported by the usual X member. This transmission position permits the use of the usual adjustable front seat 31'.

Furthermore since hydrokinetic devices generate heat, their disposition at a distance from the hot engine is of great value.

The disposition of hydrokinetic devices under the driver's seat permits the use of multiple hydrokinetic units without interference with the driver's compartment and assures better cooling, this being schematically illustrated in Fig. 3. Here a housing 52 contains a hydrokinetic clutch A and a hydrokinetic torque converter B. In the housing 53 a reverse gear is indicated.

Constructions of this sort usually operate with the torque converter at hill climb and acceleration (with the maximum of 85% efficiency), until a predetermined speed is reached. Thereafter it is changed over to the (99% efficient) hydrokinetic clutch. When an automatic changeover is used it usually operates by a governor controlled oil line wherein the operating fluid is first pumped into the converter. Then at the changeover the same fluid is taken from the converter and is supplied to the hydrokinetic clutch and vice versa (not shown).

Fig. 4 illustrates a modification of the invention. Here housing 32' contains a hydrokinetic clutch substantially similar to that indicated in Fig. 1. Here however a usual disc clutch 54 is interposed between the hydrokinetic clutch and usual change speed transmission in housing 55. This combination is not new with the applicant. In the present invention however the needed large diameter and thick hydrokinetic clutch is prevented from interfering with the driver's space of action.

Fig. 5 illustrates a further modification, wherein a usual engine 15' is provided with a clutch, not shown in clutch housing 56, they forming a first unit. The second unit is made by tubing 30' and thereto attached usual change-speed transmission in housing 56. This proposal permits the material lowering of the driver's compartment floor.

In Fig. 1, the outer part-ball sphere 26 surrounds a mechanical universal joint 22. This construction is also used in Figs. 4 and 5. In view of the fact that the mission of this joint, when in service, is limited to the engine-to-transmission lineal misalignments only, for certain application I might prefer to supplant this splined mechanical universal joint with a flexible metal disc joint (not shown).

In the constructions here proposed, the position of the usually heavy hydrokinetic transmission units reaching up to 100 lbs. permit further forward positioning of the engine without interfering with the directional stability. Forwardly positioned engines increase the useful floor space in the vehicle bodies.

For certain applications I might combine the disclosures of Figs. 4 and 5 and place the hydrokinetic clutch with the engine and place the dry clutch with the transmission under the front seat (not shown).

It will be noted that in Figs. 2, 3, 4, and 5 the adjustable front seat 31' is in the extreme rear position.

In this application the reference to "frame" shall mean a frame per se or its equivalent, as in the case of "frameless" automobiles.

What applicant claims as his invention:

1. In an automobile, a frame, an engine supported by said frame, a change speed mechanism including a hydrokinetic device, a power transfer device between said engine and said change speed mechanism, a housing for said power transfer device and said change speed mechanism, said housing being arranged rearwardly of said engine, said change speed mechanism being supported by said housing, a universally pivotal connection between one end of said housing and said engine, and a connection between the other end of said housing and said frame.

2. In an automobile, a frame, a driver's compartment and a seat therein, an engine in the front of said compartment, a change speed mechanism including a hydrokinetic device having a housing disposed under said seat, a forward extension on said housing supported by said engine by a universally pivotal connection, a resilient connection between the rear part of said housing and said frame, and a power transfer shaft between said engine and change speed mechanism including a universal connection.

3. In an automobile, a frame, a driver's compartment and an adjustable seat therein, an engine having a clutch in a housing in front of said compartment, a change speed mechanism having a housing disposed under said seat, a forward extension on said last named housing supported by said clutch housing by a universally pivotal connection, a power transfer shaft between said engine and change speed mechanism including a universal connection, a resilient connection between the rear part of said last named housing and said frame, and a remotely controlled change mechanism on said change speed mechanism.

4. In an automobile, a frame, a driver's compartment and a seat therein, an engine in the front of said compartment, a change speed mechanism having a housing disposed under said seat, a forward extension on said housing supported by said engine by a universally pivotal connection, a resilient connection between the rear part of said housing and said frame, and a power transfer shaft between said engine and change speed mechanism including a universal connection.

JULES HALTENBERGER.